United States Patent [19]

Regan et al.

[11] 4,358,085
[45] Nov. 9, 1982

[54] KEYING MEANS FOR SEGMENTED END RING BLOWOUT PREVENTER

[75] Inventors: John Regan, Palos Verdes Peninsula; Bruce J. Watkins, Palos Verdes Estates, both of Calif.

[73] Assignee: Hughes Tool Company, Houston, Tex.

[21] Appl. No.: 285,677

[22] Filed: Jul. 20, 1981

[51] Int. Cl.³ .............................................. E21B 33/06
[52] U.S. Cl. ...................................... 251/1 B; 251/5; 277/185; 277/188 A; 277/235 R
[58] Field of Search ................. 166/82, 83, 84; 277/3, 277/34.3, 185, 188 A, 235 R; 251/1 B, 5

[56] References Cited

U.S. PATENT DOCUMENTS

| | | |
|---|---|---|
| 2,945,665 | 7/1960 | Regan et al. |
| 3,100,015 | 8/1963 | Regan |
| 3,486,759 | 12/1969 | Lewis |
| 3,492,007 | 1/1970 | Jones |
| 3,561,723 | 2/1971 | Cugini |
| 3,614,111 | 10/1971 | Regan |
| 3,737,139 | 6/1973 | Watts |
| 3,897,038 | 7/1975 | Le Rouax ............................. 251/1 B |
| 3,897,071 | 7/1975 | Le Rouax ............................. 277/185 |
| 4,098,516 | 7/1978 | Murman |
| 4,099,699 | 7/1978 | Allen |
| 4,345,735 | 8/1982 | Regan et al. ......................... 251/1 B |

FOREIGN PATENT DOCUMENTS 868693 5/1961 United Kingdom ................ 251/1 B

OTHER PUBLICATIONS

Regan, U.S. patent application Ser. No. 160,787, filed Jun. 18, 1980.

*Primary Examiner*—H. Jay Spiegel
*Attorney, Agent, or Firm*—Robert A. Felsman; Guy Porter Smith

[57] ABSTRACT

An improvement in blowout preventer apparatus of the type having a radially compressible annular packing mounted within a housing chamber, the housing having axially aligned upper and lower conical bores communicating with an inner bore of the annular packing, the packing axially expanding towards said upper and lower bores upon said radial compression, a plurality of rigid end ring segments attached to sectored webs of the ends of the packing and thereby individually movable axially outwardly and radially inwardly relative to the upper and lower conical bores to control the packing axial expansion during radial compression of the packing has keying means cooperating with the rigid end ring segments of the packing and the conical bores for guiding a sector-wise movement of the segments in individually separate and predetermined paths along the conical bores to a common radial position independent of the uniformity of the packing radial compression and/or axial expansion. Exemplary keying means include a key member provided in a slot in the packing end ring segment and a mating keyway in the conical bore.

9 Claims, 9 Drawing Figures

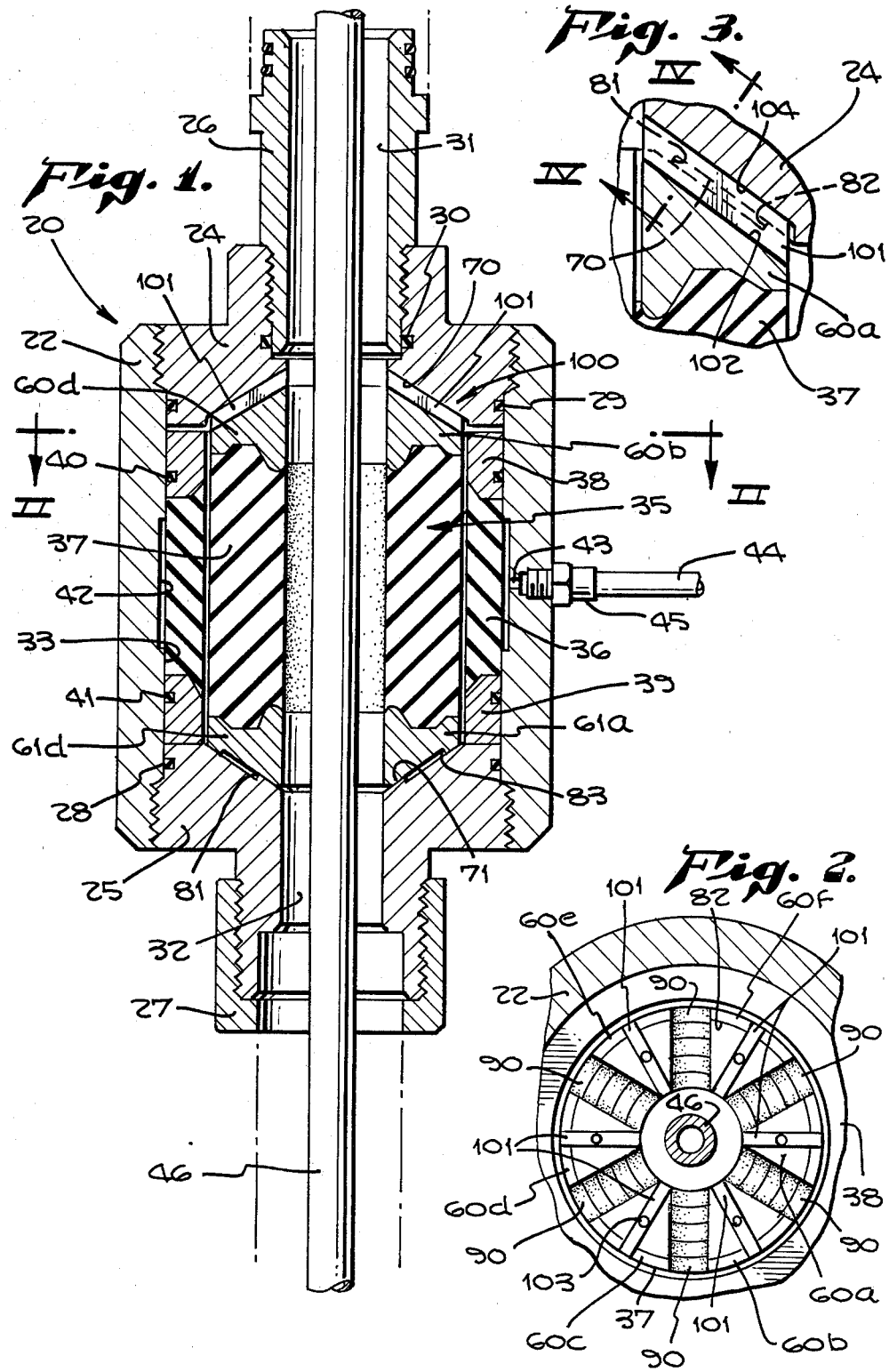

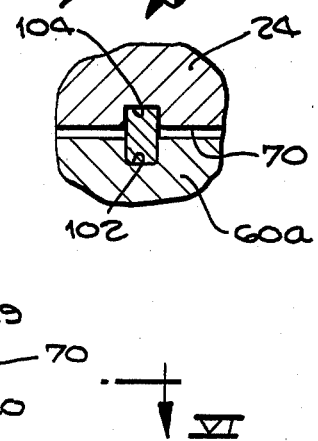
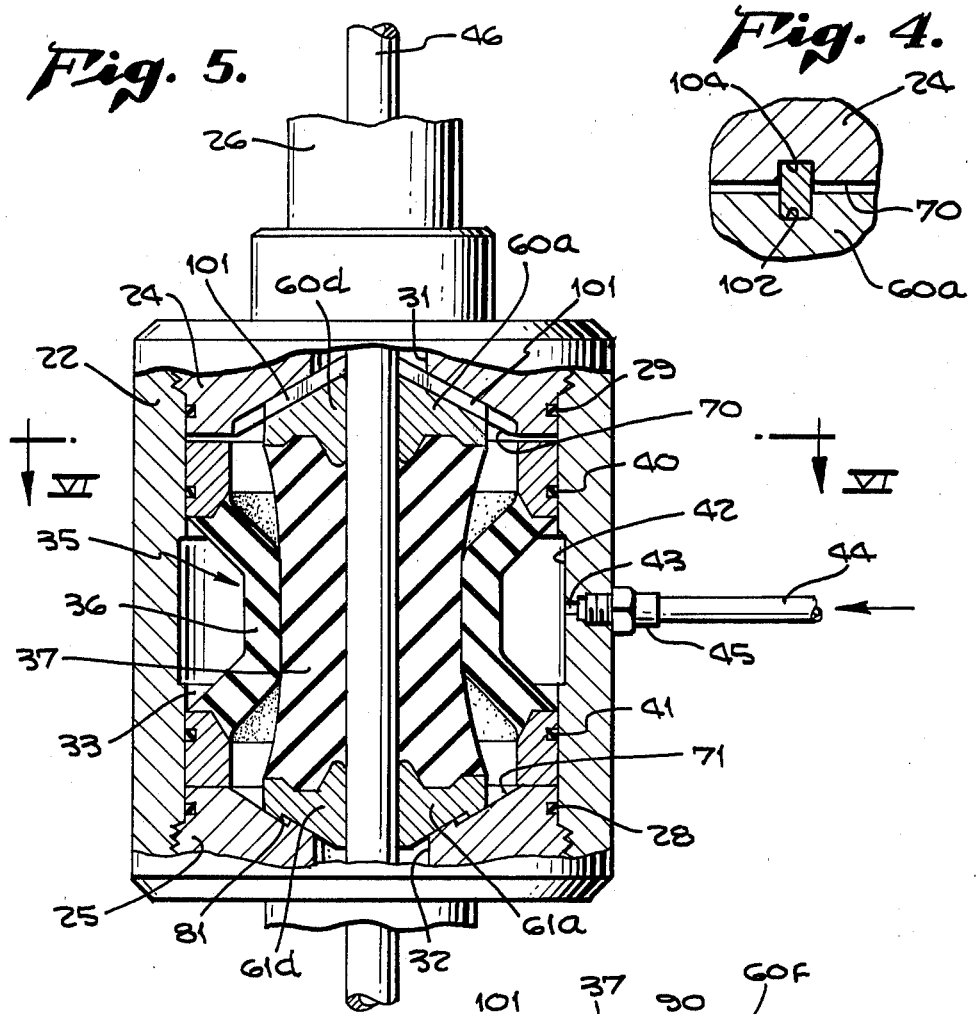
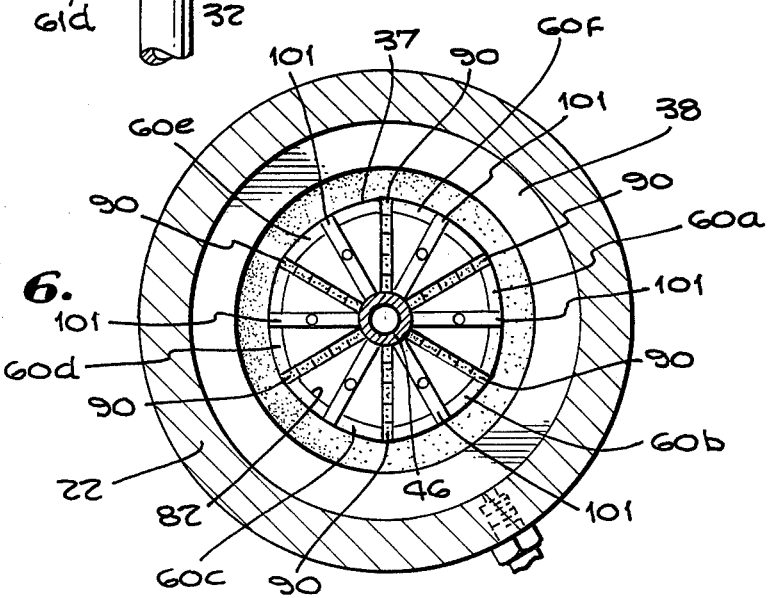

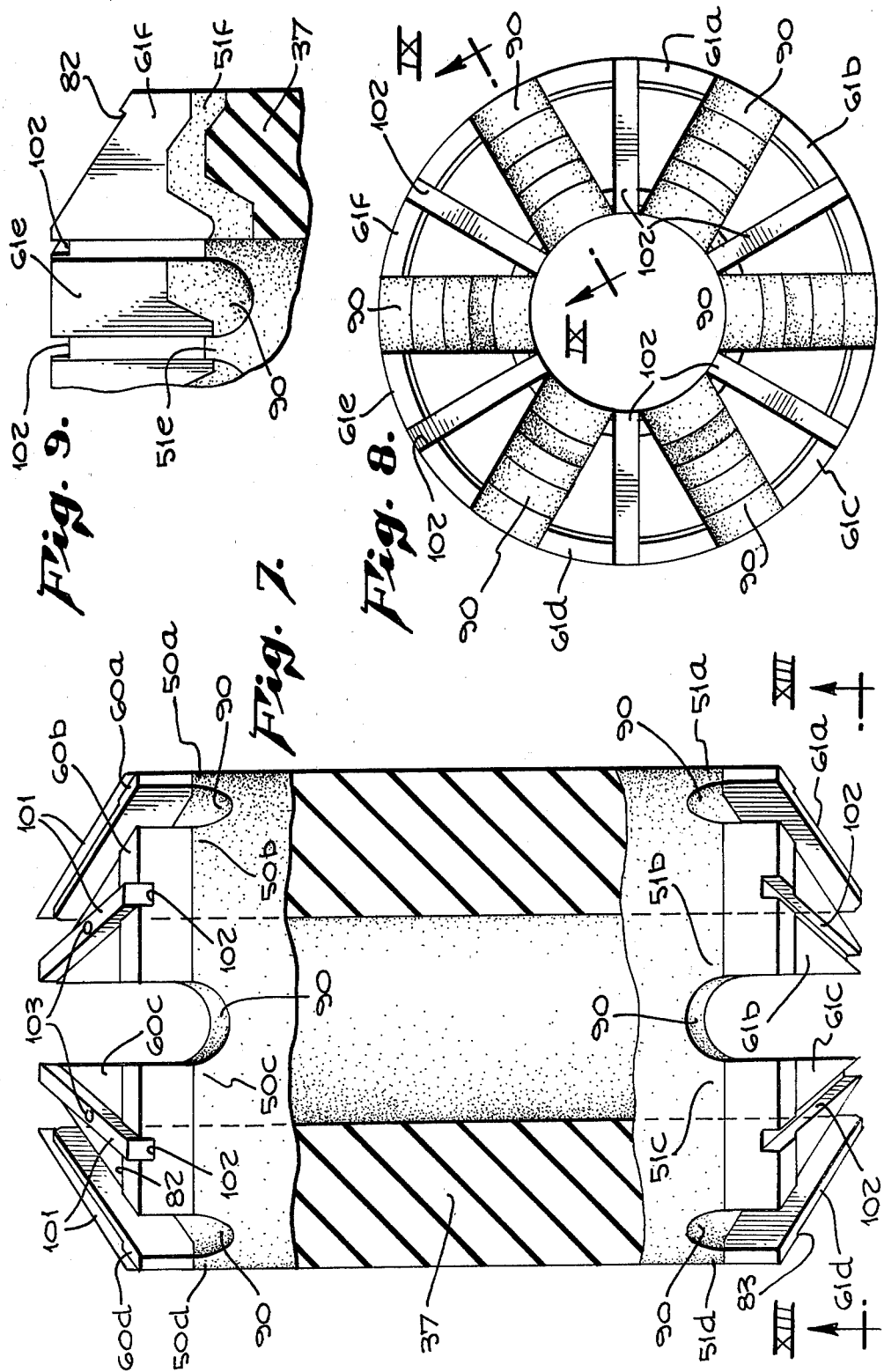

KEYING MEANS FOR SEGMENTED END RING BLOWOUT PREVENTER

BACKGROUND OF THE INVENTION

The present invention relates to blowout preventer apparatus of the type having a radially compressible annular packing mounted within a housing chamber wherein the packing expands axially as it is radially compressed. More particularly, the present invention relates to an improvement in such blowout preventer apparatus wherein segmented end rings are provided on the packer for guiding and controlling the packing movement as it expands axially within the blowout preventer apparatus housing chamber.

Various types of blowout preventer apparatus have been developed heretofore for use in subsea as well as on land oil well installations. Exemplary thereof is the blowout preventer apparatus of the prior U.S. patent application Ser. No. 160,787 filed June 18, 1980 now abandoned entitled IMPROVED BLOWOUT PREVENTER and which is assigned the common assignee of the present application. The blowout prevent apparatus of that application includes a radially compressible annular packing mounted within a housing chamber, the housing having axially aligned upper and lower conical bores communicating with an inner bore of the annular packing. An outer packing is pressured by hydraulic fluid, in known manner, to apply a radially constricting force upon the inner annular packing which, in view of such constriction, tends to expand axially into the upper and lower conical bores provided in the blowout preventer housing end flanges forming the chamber. While other prior art blowout preventers employ solid end rings to re-enforce the ends of the packing, and to guide its movement, the end rings of the blowout preventer apparatus of said application Ser. No. 160,787 are segmented into a plurality of rigid segments which are attached to the ends of the packing in order to be individually movable axially outwardly and radially inwardly relative the housing end flange conical bores during the inner packings axial expansion under the forces of radial compression applied by the outer packing. Stop means were provided in that prior blowout preventer construction for limiting the extent of travel of the segments as they moved along the conical bore surfaces.

While the provision of segmented end rings in said prior application Ser. No. 160,787 allows for individual movement of the upper and lower segments relative to each other, even during unsymmetrical radial compression of the packing member, no means was disclosed for restricting or guiding the direction of travel of each of the segments, which as independently seated upon a web portion of the packing end, individual web portions and segments being divided by grooves in the packing therebetween. We have determined that it would be desirable to provide some means for controlling the direction of segment movement in addition to the limit on the extent of movement provided in the prior blowout preventer apparatus.

SUMMARY OF THE INVENTION

It is the primary object of the present invention to disclose an improved blowout preventer apparatus of the type having segmented end rings wherein the direction of travel of the segments is controlled in addition to the extent of travel as the segments move relative to one or more confining end conical bores of the blowout preventer apparatus under the urging of an associated axially expandable packing member undergoing radial compression to seal about an oil well tool passed therethrough or to seal the packing bore and thus associated blowout preventer bores.

It is still a further object of the present invention to disclose and provide an improvement in means for controlling the direction of segment movement, as in the foregoing object which is easily and effectively incorporated into the construction and mode of operation of the blowout preventer apparatus of U.S. Application Ser. No. 160,787 which is owned by the common assignee of the present application.

Generally stated, the present invention comprises the provision of keying means cooperating with the rigid end ring segments on the packing on one or both ends and the associated conical bore of the blowout preventer housing end flanges for guiding a sector-wise movement of the packing and segments within the conical bore at one or both ends of the packing. More specifically, the present invention comprises the provision of a key member on the individual packing end ring segments which lies on a radius of the packing member and is inclined to the axis of the packing member to mate with a keyway formed in the mating conical bore within which the segment slides.

It is believed that a better understanding of the present invention is keying means for segmented end ring blowout preventers will be afforded to those skilled in the art, as well as a recognition of additional advantages and objects will be attained, from a consideration of the following detailed description of an exemplary embodiment thereof. Reference will be made to appended sheets of drawings which will first be described briefly.

BRIEF DESCRIPTION OF THE DRAWINGS

FIG. 1 is a vertical section view through an exemplary blowout preventer apparatus in which a preferred exemplary embodiment of keying means for a segmented end ring packing, in accordance with the present invention, is illustrated;

FIG. 2 is a cross-section view of the apparatus of FIG. 1 taken therein along the plane II—II;

FIG. 3 is a detail section view of the apparatus of FIG. 1;

FIG. 4 is a section view of the apparatus of FIG. 3 taken therein along the plane IV—IV;

FIG. 5 is a view as in FIG. 1 showing the exemplary blowout preventer apparatus and the exemplary segmented end ring packing apparatus in sealing relationship about an oil well tool run therethrough;

FIG. 6 is a cross-section view of the apparatus of FIG. 5 taken therein along the plane VI—VI;

FIG. 7 is a side elevation view of an exemplary segmented end ring packing member having a preferred exemplary embodiment of keying means, in accordance with the present invention, illustrated therewith;

FIG. 8 is a bottom plan view of the apparatus of FIG. 7 taken therein along the plane VIII—VIII; and FIG. 9 is a detail section view, partially in section, of the apparatus of FIG. 8 taken therein along the plane IX—IX.

DETAILED DESCRIPTION OF A PREFERRED EXEMPLARY EMBODIMENT

The present improvement in keying means for a segmented end ring packing for a blowout preventer apparatus will now be described in detail in association with the segmented end ring packing and blowout preventer apparatus described in the prior copending application Ser. No. 160,787 filed June 18, 1980 entitled IMPROVED BLOWOUT PREVENTOR and which is assigned the common assignee of the within application. The entire disclosure of said application Ser. No. 160,787 is incorporated herein by reference, with the following description thereof being made for purposes of showing the environment in which the present improvement in keying means for a segmented end ring packing finds an optimum use.

Referring now particularly to FIG. 1, the exemplary embodiment of blowout preventer apparatus is indicated generally at 20 and includes a cylindrical outer housing 22 having its threaded ends closed by a upper flange 24 and a lower flange 25. A male union sub 26 or the like, is shown threaded to upper flange 24. A union nut 27, or like, is shown threaded to the lower flange, the exemplary blowout preventer being usable in subsea or above land oil well installations. Suitable O-rings 28, 29 and 30 seal the housing members thus far described when assembled as seen in FIG. 1 with the blowout preventer having an upper or inlet bore 31, a lower or outlet bore 32 and an inner bore 33 communicating between the two and in which the packing members are installed as subsequently described.

In the exemplary embodiment of blowout preventer, a two-part annular packing assembly, indicated generally at 35, is provided within the housing inner bore 33. The exemplary bag type packing assembly is provided with an outer annular, or tubular, packing element 36 which acts upon an inner annular, or tubular, packing element 37. The packing elements are typically made up of rubber, or the like, with the outer packing element 36 having solid end rings including upper ring 38 and lower ring 39. O-rings 40 and 41 are provided in known manner to seal the outer packing against the inner surface of housing 22 with a hydraulic fluid chamber 42 being provided therebetween. Hydraulic fluid is provided in known manner to chamber 42 via passage 43, hydraulic pressure line 44 and the latters nozzle 45 which is affixed to housing 22. Hydraulic fluid may be selectively applied through pressure line 44 into the annular cavity 42 to radially compress outer packing 36 and thereby radially compress the inner packing 37.

When the inner packing 37 is radially constricted by application of hydraulic pressure thereon through the means of the outer packing 36, the inner packing not only constricts radially, but also expands axially as seen in FIG. 5. In order to provide for sealing alternatively about an oil well tool, as drill string 46, or to seal the bores 31-32, the packing 36 must undergo considerable radial constriction and associated axial expansion. As taught in the prior application Ser. No. 160,787, the exemplary packing 37 is provided with segmented end rings which ride within conical bores provided in the housing end flanges while stop means were provided in the prior application for limiting the extent of radial movement of the segments, no means was provided for guiding or keying the individual segments to move in a predetermined path in both the radial inwardly and axially outwardly direction of travel which occurs for the individual segments as they are forced by the packing inwardly and outwardly relative the housing end flange bores.

Referring now to FIGS. 7, 8 and 9, particularly, the exemplary embodiment of inner packing 37 is provided with a plurality of individually movable upper packing finger portions 50a, 50b, 50c, 50d, 50e and 50f separated by grooves 90 and having individually movable therewith rigid, metal end ring segments 60a, 60b, 60c, 60d, 60e and 60f. Lower portions of packing 37 are provided with lower packing finger portions 51a, 51b, 51c, 51d, 51e and 51f separated by grooves 90 and having individually movable rigid, metal end ring segments 61a, 61b, 61c, 61d, 61e and 61f provided thereon. The grooves 90 allow the separate finger portions, denoted generally as 50 and 51 to move in sector like fashion with the individual segmented end ring members or segments, generally designated as 60 and 61, to move in a nonuniform manner in response to an unsymmetrical sector-wise compression of packing 37 by the outer packing element 36. The individual packing end ring segments 60 and 61 ride in the housing end flange conical bores 70 and 71, respectively. The upper and lower end flange bores 70 and 71, as in the prior application Ser. No. 160,787, are provided in conical configuration and have annular shoulders, as shoulder 81 in FIG. 1, to limit the extent of radial movement of the end ring segments 60 and 61 when no oil well tool, such as string 46 is located in the upper and lower bores 31 and 32. As seen in FIGS. 7, 8 and 9, the upper end ring segments 60 are each provided with an arcuate shoulder 82 while the lower end ring segments 61 are each provided with an arcuated shoulder 83. These shoulers 82 and 83 cooperate with the end flange annular shoulders, as shoulder 81 in lower flange 25 as seen in FIG. 1, to limit the extent of inward travel of the segments as the inner packing 37 actually expands and the segments move individually in a convergent motion into the upper and lower flange bores, to a tool sealing position as seen in FIG. 6.

The foregoing description of an exemplary blowout preventer apparatus may be summarized as a blowout preventer apparatus having a radially compressible annular packing mounted within a housing chamber, the housing having axially aligned upper and lower conical bores communicating with an inner bore of the annular packing, wherein the packing axially expands toward the upper and lower bores during radial compression thereof together with a plurality of rigid means, attached to the ends of the packing and which are individually movable axially outwardly and radially inwardly relative the upper and lower conical bores for controlling the packing axial expansion. While as noted before, in the embodiment of said prior application Ser. No. 160,787, stop means were provided for the limiting the extent of movement of the individual segments, a means for guiding or controlling the direction of movement of the segments during their extent of movement was not provided. It is therefore particularly contemplated within the present invention to provide keying means cooperating with the rigid segment means 60 and 61 and the conical bores 70 and 71 of housing end flanges 24 and 25 for guiding the sector-wise movement of the individual rigid segments 60 and 61 in individual separate and predetermined paths as the inner packing 37 is radially compressed and axially expanded.

Keying means in accordance with the present improvement in blowout preventer apparatus are employed between the rigid packing end segments at at least one, or both ends, of packing 37 and the associated housing end flanges 24 and 25, such means being indicated generally at 100 in FIG. 1 in association with segments 60 and flange conical bore 70. As seen in FIG. 1, and perhaps in more detail in FIGS. 7, 8 and 9, each of the segments 60, 61 is provided with a key member 101 which is fitted into a key receiving slot 102 and held therein as by machine bolts 103 counter-sunk in the key members 101. Each key member of member 101 is inclined to the vertical axis of the annular packing 37 and extends radially away from such axis, as seen in FIG. 3, generally toward a horizontal end line of the packing. As seen in FIG. 7, the lower segments 61 are shown without the key members inserted in order to illustrate the key receiving slots 102. It is contemplated within the present invention that key members 101 would be held in each one of the segments 60, 61. Mating key member guide slots or keyways are preferably formed integrally of the end flanges 24 and 25 in the respective conical bores 70 and 71, respectively, to receive and guide the individual segments 60, 61 by an abutting relation with key members 101. As seen in FIG. 3, upper flange 24 may be provided with mating keyways 104 formed in conical bores 70. Similar mating keyways, not shown, are preferably provided in the bottom end flange 25 in its conical bore 71 to mate with the key members 101 mounted to segments 61 as seen in FIG. 6. The keyways in end flanges 24 and 25, as keyway 104 in FIG. 3, guide the mating members 101 in abutting side to side relationship while allowing the key members, and the segments to which they are secured, to move in a predetermined path radially inwardly and axially outwardly in a uniform direction, although in an individually movable manner, between the expanded packing related position for the segments, as segments 60 in FIG. 2, to the constricted and axially elongated or expanded packing position of FIG. 5 with the segments being in the position as segments 61 in FIG. 6.

It is contemplated within the present invention to provide the disclosed keying means at one end of the packing at least, or alternatively at both ends as disclosed in the exemplary embodiment. When the inventive keying means is employed at only one end the packing, a conventional solid end ring may be employed at the opposite packing end. It should be now apparent to those skilled in art from a consideration of the foregoing detailed description of an exemplary embodiment of blowout preventer apparatus and a preferred exemplary embodiment of keying means for use in association therewith that the present invention achieves the various advantages and objectives stated therefore, that alternatives, modifications and various alternative embodiments can be made thereof within the scope of the present invention which is defined by the following claims.

We claim:

1. An improved blowout preventer apparatus of the type having a radially compressible annular packing mounted within a housing chamber, said housing having axially aligned upper and lower conical bores communicating with an inner bore of said annular packing, said packing axially expanding toward said upper and lower bores upon said radial compression, a plurality of rigid means, attached to the ends of said packing and individually movable axially outwardly and radially inwardly in contact with said upper and lower bores, for controlling said packing axial expansion, wherein the improvement comprises:

keying means cooperating with said rigid means and said conical bores for guiding said sector-wise movement of said rigid means in contact with said conical bores over substantially their entire travel relative to said bores in individually separate and predetermined radial paths toward a common radial position independent of the uniformity of said packing radial compression.

2. The improvement in blowout preventer apparatus of claim 1 wherein said keying means comprises a key member and mating keyway slot for said rigid means.

3. The improvement in blowout preventer apparatus of claim 2 wherein said key member is secured to said rigid means and said keyway slot is formed in the associated conical bore.

4. In a blowout preventer apparatus having a housing chamber with axially aligned upper and lower bores, at least one of said bores being a conical bore, a radially compressible and axially expandable annular packing concentrically disposed within said housing in alignment with said upper and lower bores, said packing having an inner bore and axially expanding within said bores when radially compressed, said packing having end portions of which at least one end portion is radially sectored into vertical webs, a plurality of circumferentially-arranged rigid end ring segments, each carried by one of said webs of said packing, and said segments being generally wedge-shaped and individually movable in contact with said conical bore, as said packing axially expands and contracts, to allow said packing to undergo nonuniform sector-wise deformation to seal said packing inner bore from said upper and lower housing bores, the improvement comprising the provision of:

means interacting with said conical bore and each one of said segments for guiding said generally wedge-shaped and individually movable rigid segments in contact with the associated conical bore over substantially its entire travel relative said bore whereby said segments are confined to a predetermined direction of movement along said conical bore.

5. The improvement in blowout preventer apparatus of claim 4 wherein said means for guiding comprises:

a keying member on each of said rigid segments and a mating keyway slot formed in said associated conical bore.

6. In an oil well blowout preventer of the type having a radially compressible annular packing in a housing chamber, at least one of said bores being a conical bore, said housing having axially aligned upper and lower flanges having bores communicating with said chamber, means for radially constricting said packing, thereby causing it to axially expand, the packing having radially sectored end web portions divided by end grooves in said packing, a plurality of circumferentially-arranged individual rigid means each carried by one of said sectored end web portions and individually movable radially inwardly and axially outwardly in contact with said conical bore, whereby radial sectors of said packing move sequentially to effect a seal between said upper and lower flanges bores in response to progressive axial expansion of said packing as said packing undergoes sector-wise radial compression; and means for limiting inward radial movement of said rigid means to a common radial position independent of the uniformity of said radial compression, the improvement comprising the provision of:

guide means interacting with each one of said rigid means and the conical bore of at least one of said housing flanges for guiding said rigid means in contact with said conical bore over substantially its entire travel relative said bore in a predetermined path of travel between a first radial position before radial compression of said packing and a second radial position inwardly of said first position after said packing undergoes radial compression.

7. An improved blowout preventer apparatus of the type having a housing, housing chamber, a radially compressible and annularly expandible annular packing of a rubber-like material concentrically disposed within the housing chamber, said housing having axially aligned upper and lower bores at least one of which is a conical bore communicating with an inner bore of said annular packing, said packing axially expanding into said bores upon said radial compression, a plurality of individual rigid means, attached to at least one of the ends of said packing and individually movable radially inward and axially outwardly in contact with said conical bore, for controlling said axial expansion, wherein the improvement comprises:

first means on said rigid means and second means on said conical bore with said first and second means in mutually abutting contact as said packing axially expands for limiting the direction of movement of said rigid means in contact with said conical bore over substantially its entire travel relative said bore and to a predetermined radial inward and axially outward path of movement which is independent of the uniformity of said radial compression.

8. The improved apparatus of claim 7 wherein said first means comprises a key member having a longitudinal extend which is inclined to the vertical axis of said annular packing and extends radially away from said axis.

9. The improved apparatus of claim 8 wherein said first means comprises key members, each on a rigid means and an equal number of mating keyways provided on said conical bore.

* * * * *